US011979428B1

(12) United States Patent
Ismael et al.

(10) Patent No.: US 11,979,428 B1
(45) Date of Patent: *May 7, 2024

(54) TECHNIQUE FOR VERIFYING EXPLOIT/MALWARE AT MALWARE DETECTION APPLIANCE THROUGH CORRELATION WITH ENDPOINTS

(71) Applicant: FireEye, Inc., Milpitas, CA (US)

(72) Inventors: Osman Abdoul Ismael, Palo Alto, CA (US); Ashar Aziz, Coral Gables, FL (US)

(73) Assignee: Musarubra US LLC, Plano, TX (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/087,550

(22) Filed: Nov. 2, 2020

Related U.S. Application Data

(63) Continuation of application No. 15/258,656, filed on Sep. 7, 2016, now Pat. No. 10,826,933.
(Continued)

(51) Int. Cl.
*H04L 9/40* (2022.01)
*G06F 21/53* (2013.01)

(52) U.S. Cl.
CPC .......... *H04L 63/145* (2013.01); *G06F 21/53* (2013.01); *H04L 63/0245* (2013.01); *G06F 2221/033* (2013.01)

(58) Field of Classification Search
CPC ... H04L 63/145; H04L 63/0245; G06F 21/53; G06F 2221/033
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

U.S. Appl. No. 15/258,656, filed Sep. 7, 2016 Advisory Action dated Jan. 31, 2019.
(Continued)

*Primary Examiner* — David Garcia Cervetti
(74) *Attorney, Agent, or Firm* — Rutan & Tucker, LLP

(57) ABSTRACT

A technique verifies a determination of an exploit or malware in an object at a malware detection system (MDS) appliance through correlation of behavior activity of the object running on endpoints of a network. The appliance may analyze the object to render a determination that the object is suspicious and may contain the exploit or malware. In response, the MDS appliance may poll the endpoints (or receive messages pushed from the endpoints) to determine as to whether any of the endpoints may have analyzed the suspect object and observed its behaviors. If the object was analyzed, the endpoints may provide the observed behavior information to the appliance, which may then correlate that information, e.g., against correlation rules, to verify its determination of the exploit or malware. In addition, the appliance may task the endpoints to analyze the object, e.g., during run time, to determine whether it contains the exploit and provide the results to the appliance for correlation.

20 Claims, 6 Drawing Sheets

Related U.S. Application Data

(60) Provisional application No. 62/316,427, filed on Mar. 31, 2016, provisional application No. 62/316,390, filed on Mar. 31, 2016.

(56) References Cited

U.S. PATENT DOCUMENTS

| | | | |
|---|---|---|---|
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,321,338 B1 | 11/2001 | Porras et al. | |
| 6,357,008 B1 | 3/2002 | Nachenberg | |
| 6,424,627 B1 | 7/2002 | Sørhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,978,015 B1 | 12/2005 | Erickson et al. | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,188,367 B1 | 3/2007 | Edwards et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,373,666 B2 * | 5/2008 | Kaler ................ G06F 21/554 709/224 | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,600,007 B1 | 10/2009 | Lewis | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,500 B2 | 11/2010 | Nason et al. | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,178 B1 | 10/2011 | Fisher et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,056,136 B1 | 11/2011 | Zaitsev | |
| 8,069,484 B2 | 11/2011 | McMillan et al. | |
| 8,087,086 B1 | 12/2011 | Lai et al. | |
| 8,095,964 B1 * | 1/2012 | Zhong ................ H04L 63/1416 726/4 | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,181,247 B1 * | 5/2012 | Pavlyushchik ....... G06F 21/566 726/22 | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |

(56) References Cited

U.S. PATENT DOCUMENTS

| | | |
|---|---|---|
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,388 B1 | 10/2013 | Wang et al. |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,621,632 B1 * | 12/2013 | Smith ................. G06F 21/566 726/22 |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,790 B1 | 7/2014 | Smith et al. |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,813,222 B1 | 8/2014 | Codreanu et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,850,584 B2 | 9/2014 | Alme et al. |
| 8,854,474 B2 | 10/2014 | Blumstein-Koren et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,955,138 B1 * | 2/2015 | Mahadik ................. G06F 21/55 726/22 |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,616 B2 | 7/2015 | Kumar et al. |
| 9,094,443 B1 | 7/2015 | Martini et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,148,441 B1 | 9/2015 | Tamersoy et al. |
| 9,159,035 B1 | 10/2015 | Ismael et al. |
| 9,166,997 B1 | 10/2015 | Guo et al. |
| 9,171,154 B2 | 10/2015 | Pereira |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,202,050 B1 | 12/2015 | Nachenberg |
| 9,203,862 B1 | 12/2015 | Kashyap et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,280,663 B2 | 3/2016 | Pak et al. |
| 9,282,109 B1 | 3/2016 | Aziz et al. |
| 9,282,116 B1 | 3/2016 | Rovniaguin |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,332,029 B1 | 5/2016 | Tikhonov |
| 9,336,385 B1 * | 5/2016 | Spencer ............. H04L 63/1441 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,401,142 B1 | 7/2016 | Rothwell et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,578,064 B2 | 2/2017 | Lango et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |

(56) References Cited

U.S. PATENT DOCUMENTS

| | | |
|---|---|---|
| 9,635,041 B1 | 4/2017 | Warman et al. |
| 9,641,544 B1 | 5/2017 | Treat et al. |
| 9,641,546 B1 | 5/2017 | Manni et al. |
| 9,654,485 B1* | 5/2017 | Neumann ............ H04L 63/1416 |
| 9,661,009 B1 | 5/2017 | Karandikar et al. |
| 9,661,018 B1 | 5/2017 | Aziz |
| 9,674,210 B1 | 6/2017 | Oprea et al. |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,734,138 B2 | 8/2017 | Rothwell et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,294 B1 | 8/2017 | Marquardt et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,405 B1 | 12/2017 | Guo et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,960,975 B1* | 5/2018 | Van Horenbeeck ........................ H04L 63/1416 |
| 9,973,531 B1 | 5/2018 | Thioux |
| 9,977,895 B2* | 5/2018 | Danahy ................. G06F 21/554 |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,178,119 B1 | 1/2019 | Brandwine et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,200,866 B1 | 2/2019 | Cratsenburg et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,333,962 B1 | 6/2019 | Brandwine et al. |
| 10,454,950 B1 | 10/2019 | Aziz |
| 10,642,753 B1 | 5/2020 | Steinberg |
| 10,650,142 B1* | 5/2020 | Chen .................... G06F 21/566 |
| 10,826,933 B1* | 11/2020 | Ismael ................. H04L 63/145 |
| 10,972,488 B2* | 4/2021 | Pal ...................... H04L 63/1441 |
| 11,182,476 B2* | 11/2021 | Mitelman ............. G06F 21/552 |
| 11,269,977 B2* | 3/2022 | Turgeman ........ G06Q 20/40145 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194489 A1 | 12/2002 | Almogy et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0016437 A1* | 1/2004 | Cobb ................ G06Q 10/06375 131/270 |
| 2004/0019832 A1 | 1/2004 | Arnold et al. |
| 2004/0024767 A1 | 2/2004 | Chen |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0133672 A1 | 7/2004 | Bhattacharya et al. |
| 2004/0165588 A1 | 8/2004 | Pandya |
| 2004/0193923 A1* | 9/2004 | Hammond, II ....... H04L 41/046 726/25 |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |

(56) References Cited

U.S. PATENT DOCUMENTS

| | | |
|---|---|---|
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0060562 A1 | 3/2005 | Bhattacharya et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101264 A1 | 5/2006 | Costea et al. |
| 2006/0101282 A1 | 5/2006 | Costea et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0137012 A1 | 6/2006 | Aaron |
| 2006/0143709 A1 | 6/2006 | Brooks et al. |
| 2006/0150249 A1 | 7/2006 | Gassen et al. |
| 2006/0156380 A1 | 7/2006 | Gladstone et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0008098 A1 | 1/2007 | Wong |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038677 A1 | 2/2007 | Reasor et al. |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0089165 A1 | 4/2007 | Wei et al. |
| 2007/0094730 A1 | 4/2007 | Bhikkaji et al. |
| 2007/0101435 A1 | 5/2007 | Konanka et al. |
| 2007/0121596 A1 | 5/2007 | Kurapati et al. |
| 2007/0128855 A1 | 6/2007 | Cho et al. |
| 2007/0130319 A1 | 6/2007 | Tse et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0192866 A1* | 8/2007 | Sagoo ................... G06F 21/52 726/24 |
| 2007/0198275 A1 | 8/2007 | Malden et al. |
| 2007/0208822 A1 | 9/2007 | Wang et al. |
| 2007/0209074 A1 | 9/2007 | Coffman |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256127 A1 | 11/2007 | Kraemer et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0005797 A1* | 1/2008 | Field ................... G06F 21/575 726/24 |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0047013 A1* | 2/2008 | Claudatos ............. G06F 21/568 726/24 |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244742 A1 | 10/2008 | Neystadt et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0138303 A1* | 5/2009 | Seshadri ................ G06Q 10/087 705/1.1 |
| 2009/0144823 A1 | 6/2009 | Lamastra et al. |

(56) References Cited

U.S. PATENT DOCUMENTS

| | | |
|---|---|---|
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0282478 A1 | 11/2009 | Jiang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0071051 A1 | 3/2010 | Choyi et al. |
| 2010/0077481 A1 | 3/2010 | Polyakov et al. |
| 2010/0083376 A1 | 4/2010 | Pereira et al. |
| 2010/0094459 A1 | 4/2010 | Cho et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281540 A1 | 11/2010 | Alme |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0055925 A1 | 3/2011 | Jakobsson |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0191849 A1 | 8/2011 | Jayaraman et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0288692 A1* | 11/2011 | Scott ............... H04L 63/20 700/297 |
| 2011/0289582 A1 | 11/2011 | Kejriwal et al. |
| 2011/0302587 A1 | 12/2011 | Nishikawa et al. |
| 2011/0302656 A1* | 12/2011 | El-Moussa ......... H04L 63/1416 726/24 |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0030750 A1* | 2/2012 | Bhargava ............... H04L 63/02 726/13 |
| 2012/0036576 A1 | 2/2012 | Iyer |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0254995 A1 | 10/2012 | Sallam |
| 2012/0255001 A1 | 10/2012 | Sallam |
| 2012/0255003 A1 | 10/2012 | Sallam |
| 2012/0255004 A1 | 10/2012 | Sallam |
| 2012/0255012 A1 | 10/2012 | Sallam |
| 2012/0255013 A1 | 10/2012 | Sallam |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0304244 A1 | 11/2012 | Xie et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0042294 A1 | 2/2013 | Colvin et al. |
| 2013/0047257 A1 | 2/2013 | Aziz |
| 2013/0074185 A1 | 3/2013 | McDougal et al. |
| 2013/0086247 A1 | 4/2013 | Burckart et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0145463 A1 | 6/2013 | Ghosh et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298192 A1* | 11/2013 | Kumar ............... H04L 63/1425 726/25 |
| 2013/0298243 A1 | 11/2013 | Kumar et al. |

(56) References Cited

U.S. PATENT DOCUMENTS

| | | | |
|---|---|---|---|
| 2013/0303154 A1* | 11/2013 | Gupta | G06F 11/3466 455/423 |
| 2013/0304869 A1* | 11/2013 | Gupta | G06F 21/554 709/219 |
| 2013/0305369 A1 | 11/2013 | Karta et al. | |
| 2013/0318038 A1 | 11/2013 | Shiffer et al. | |
| 2013/0318073 A1 | 11/2013 | Shiffer et al. | |
| 2013/0325791 A1 | 12/2013 | Shiffer et al. | |
| 2013/0325792 A1 | 12/2013 | Shiffer et al. | |
| 2013/0325871 A1 | 12/2013 | Shiffer et al. | |
| 2013/0325872 A1 | 12/2013 | Shiffer et al. | |
| 2013/0340080 A1* | 12/2013 | Gostev | H04L 63/145 726/24 |
| 2014/0007238 A1 | 1/2014 | Magee et al. | |
| 2014/0013434 A1 | 1/2014 | Ranum et al. | |
| 2014/0032875 A1 | 1/2014 | Butler | |
| 2014/0053260 A1* | 2/2014 | Gupta | G06F 21/50 726/22 |
| 2014/0053261 A1 | 2/2014 | Gupta et al. | |
| 2014/0068769 A1* | 3/2014 | Neil | H04L 63/1425 726/23 |
| 2014/0130158 A1 | 5/2014 | Wang et al. | |
| 2014/0130161 A1 | 5/2014 | Golovanov | |
| 2014/0137180 A1 | 5/2014 | Lukacs et al. | |
| 2014/0157405 A1 | 6/2014 | Joll et al. | |
| 2014/0169762 A1 | 6/2014 | Ryu | |
| 2014/0179360 A1 | 6/2014 | Jackson et al. | |
| 2014/0181131 A1 | 6/2014 | Ross | |
| 2014/0189687 A1 | 7/2014 | Jung et al. | |
| 2014/0189866 A1 | 7/2014 | Shiffer et al. | |
| 2014/0189882 A1 | 7/2014 | Jung et al. | |
| 2014/0215608 A1 | 7/2014 | Rajagopalan et al. | |
| 2014/0237600 A1 | 8/2014 | Silberman et al. | |
| 2014/0245374 A1 | 8/2014 | Deerman et al. | |
| 2014/0280245 A1 | 9/2014 | Wilson | |
| 2014/0283037 A1 | 9/2014 | Sikorski et al. | |
| 2014/0283063 A1 | 9/2014 | Thompson et al. | |
| 2014/0283066 A1 | 9/2014 | Teddy et al. | |
| 2014/0289323 A1 | 9/2014 | Kutaragi et al. | |
| 2014/0328204 A1 | 11/2014 | Klotsche et al. | |
| 2014/0337836 A1 | 11/2014 | Ismael | |
| 2014/0337862 A1 | 11/2014 | Valencia et al. | |
| 2014/0344926 A1 | 11/2014 | Cunningham et al. | |
| 2014/0351935 A1 | 11/2014 | Shao et al. | |
| 2014/0373155 A1 | 12/2014 | Whitehouse et al. | |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0007325 A1 | 1/2015 | Eliseev et al. | |
| 2015/0047046 A1 | 2/2015 | Pavlyushchik | |
| 2015/0067862 A1 | 3/2015 | Yu et al. | |
| 2015/0067866 A1 | 3/2015 | Ibatullin et al. | |
| 2015/0074806 A1 | 3/2015 | Roundy et al. | |
| 2015/0096022 A1 | 4/2015 | Vincent et al. | |
| 2015/0096023 A1 | 4/2015 | Mesdaq et al. | |
| 2015/0096024 A1 | 4/2015 | Haq et al. | |
| 2015/0096025 A1 | 4/2015 | Ismael | |
| 2015/0101047 A1 | 4/2015 | Sridhara et al. | |
| 2015/0101048 A1 | 4/2015 | Sridhara et al. | |
| 2015/0106942 A1 | 4/2015 | Borghetti et al. | |
| 2015/0121524 A1 | 4/2015 | Fawaz et al. | |
| 2015/0150130 A1 | 5/2015 | Fiala et al. | |
| 2015/0161386 A1 | 6/2015 | Gupta et al. | |
| 2015/0163121 A1 | 6/2015 | Mahaffey et al. | |
| 2015/0180886 A1 | 6/2015 | Staniford et al. | |
| 2015/0186645 A1 | 7/2015 | Aziz et al. | |
| 2015/0199513 A1 | 7/2015 | Ismael et al. | |
| 2015/0199531 A1 | 7/2015 | Ismael et al. | |
| 2015/0199532 A1 | 7/2015 | Ismael et al. | |
| 2015/0205962 A1 | 7/2015 | Swidowski et al. | |
| 2015/0220734 A1 | 8/2015 | Nalluri et al. | |
| 2015/0220735 A1 | 8/2015 | Paithane et al. | |
| 2015/0244730 A1 | 8/2015 | Vu et al. | |
| 2015/0288659 A1 | 10/2015 | Lukacs et al. | |
| 2015/0327518 A1 | 11/2015 | Han et al. | |
| 2015/0365427 A1 | 12/2015 | Ben-Shalom et al. | |
| 2015/0372980 A1 | 12/2015 | Eyada | |
| 2016/0004869 A1 | 1/2016 | Ismael et al. | |
| 2016/0006756 A1 | 1/2016 | Ismael et al. | |
| 2016/0014159 A1* | 1/2016 | Schrecker | H04L 63/20 726/1 |
| 2016/0019388 A1 | 1/2016 | Singla et al. | |
| 2016/0034361 A1 | 2/2016 | Block et al. | |
| 2016/0044000 A1 | 2/2016 | Cunningham | |
| 2016/0065601 A1 | 3/2016 | Gong et al. | |
| 2016/0078225 A1 | 3/2016 | Ray et al. | |
| 2016/0078229 A1 | 3/2016 | Gong et al. | |
| 2016/0078347 A1 | 3/2016 | Salajegheh et al. | |
| 2016/0080345 A1 | 3/2016 | Safruti et al. | |
| 2016/0080413 A1 | 3/2016 | Smith et al. | |
| 2016/0080417 A1 | 3/2016 | Thomas et al. | |
| 2016/0080418 A1 | 3/2016 | Ray et al. | |
| 2016/0080420 A1 | 3/2016 | Ray et al. | |
| 2016/0092682 A1* | 3/2016 | Adams | G06F 11/3688 726/23 |
| 2016/0099963 A1 | 4/2016 | Mahaffey et al. | |
| 2016/0112451 A1 | 4/2016 | Jevans | |
| 2016/0127367 A1 | 5/2016 | Jevans | |
| 2016/0127393 A1 | 5/2016 | Aziz et al. | |
| 2016/0127406 A1 | 5/2016 | Smith et al. | |
| 2016/0142432 A1 | 5/2016 | Manadhata et al. | |
| 2016/0164960 A1 | 6/2016 | Marinelli et al. | |
| 2016/0173509 A1 | 6/2016 | Ray et al. | |
| 2016/0173510 A1 | 6/2016 | Harris et al. | |
| 2016/0191465 A1 | 6/2016 | Thomas et al. | |
| 2016/0191547 A1 | 6/2016 | Zafar et al. | |
| 2016/0191550 A1 | 6/2016 | Ismael et al. | |
| 2016/0205138 A1 | 7/2016 | Krishnaprasad | |
| 2016/0232353 A1 | 8/2016 | Gupta et al. | |
| 2016/0253498 A1 | 9/2016 | Valencia et al. | |
| 2016/0261465 A1* | 9/2016 | Gupta | H04L 43/08 |
| 2016/0261612 A1 | 9/2016 | Mesdaq et al. | |
| 2016/0285897 A1 | 9/2016 | Gantman et al. | |
| 2016/0285914 A1 | 9/2016 | Singh et al. | |
| 2016/0301703 A1 | 10/2016 | Aziz | |
| 2016/0301704 A1 | 10/2016 | Hassanzadeh et al. | |
| 2016/0301709 A1 | 10/2016 | Hassanzadeh et al. | |
| 2016/0314298 A1 | 10/2016 | Martini et al. | |
| 2016/0323295 A1 | 11/2016 | Joram et al. | |
| 2016/0323304 A1* | 11/2016 | Terada | H04L 63/1408 |
| 2016/0335110 A1 | 11/2016 | Paithane et al. | |
| 2016/0359890 A1 | 12/2016 | Deen et al. | |
| 2016/0379136 A1 | 12/2016 | Chen et al. | |
| 2016/0381057 A1 | 12/2016 | Das et al. | |
| 2017/0017537 A1 | 1/2017 | Razin et al. | |
| 2017/0026949 A1 | 1/2017 | Ouyang et al. | |
| 2017/0046510 A1 | 2/2017 | Chen et al. | |
| 2017/0083703 A1 | 3/2017 | Abbasi et al. | |
| 2017/0083705 A1 | 3/2017 | Lee et al. | |
| 2017/0093899 A1 | 3/2017 | Horesh et al. | |
| 2017/0118241 A1 | 4/2017 | Call et al. | |
| 2017/0149804 A1 | 5/2017 | Kolbitsch et al. | |
| 2017/0171235 A1* | 6/2017 | Mulchandani | G06F 21/554 |
| 2017/0195347 A1 | 7/2017 | Hay et al. | |
| 2017/0223046 A1 | 8/2017 | Singh | |
| 2017/0243000 A1 | 8/2017 | Shraim et al. | |
| 2017/0249560 A1 | 8/2017 | Cudak et al. | |
| 2017/0272453 A1 | 9/2017 | Murray et al. | |
| 2017/0316206 A1 | 11/2017 | Zou et al. | |
| 2018/0013770 A1 | 1/2018 | Ismael | |
| 2018/0048660 A1 | 2/2018 | Paithane et al. | |
| 2018/0096142 A1 | 4/2018 | Xu et al. | |
| 2018/0121316 A1 | 5/2018 | Ismael et al. | |
| 2018/0176247 A1 | 6/2018 | Smith et al. | |
| 2018/0189484 A1* | 7/2018 | Danahy | G06N 20/00 |
| 2018/0288077 A1 | 10/2018 | Siddiqui et al. | |
| 2018/0322286 A1* | 11/2018 | Diehl | G06F 21/552 |

(56) References Cited

U.S. PATENT DOCUMENTS

| | | | | |
|---|---|---|---|---|
| 2019/0081967 | A1* | 3/2019 | Balabine | H04L 63/1425 |
| 2022/0038483 | A1* | 2/2022 | George | H04L 67/12 |

FOREIGN PATENT DOCUMENTS

| | | | |
|---|---|---|---|
| WO | 0206928 | A2 | 1/2002 |
| WO | 02/23805 | A2 | 3/2002 |
| WO | 2007117636 | A2 | 10/2007 |
| WO | 2008/041950 | A2 | 4/2008 |
| WO | 2011/084431 | A2 | 7/2011 |
| WO | 2011/112348 | A1 | 9/2011 |
| WO | 2012/075336 | A1 | 6/2012 |
| WO | 2012/145066 | A1 | 10/2012 |
| WO | 2013/067505 | A1 | 5/2013 |

OTHER PUBLICATIONS

U.S. Appl. No. 15/258,656, filed Sep. 7, 2016 Final Office Action dated Oct. 26, 2018.

U.S. Appl. No. 15/258,656, filed Sep. 7, 2016 Final Office Action dated Sep. 18, 2019.

U.S. Appl. No. 15/258,656, filed Sep. 7, 2016 Non-Final Office Action dated Apr. 6, 2018.

U.S. Appl. No. 15/258,656, filed Sep. 7, 2016 Non-Final Office Action dated Jan. 31, 2020.

U.S. Appl. No. 15/258,656, filed Sep. 7, 2016 Non-Final Office Action dated May 30, 2019.

U.S. Appl. No. 15/258,656, filed Sep. 7, 2016 Notice of Allowance dated May 27, 2020.

U.S. Appl. No. 15/473,154, filed Mar. 29, 2017 Final Office Action dated Apr. 29, 2019.

U.S. Appl. No. 15/473,154, filed Mar. 29, 2017 Non-Final Office Action dated Feb. 26, 2020.

U.S. Appl. No. 15/473,154, filed Mar. 29, 2017 Non-Final Office Action dated Nov. 29, 2018.

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

(56) References Cited

OTHER PUBLICATIONS

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 17/146,417, filed Jan. 11, 2021 Final Office Action dated Feb. 14, 2023.

U.S. Appl. No. 17/146,417, filed Jan. 11, 2021 Non-Final Office Action dated Nov. 17, 2022.

U.S. Appl. No. 17/146,417, filed Jan. 11, 2021 Non-Final Office Action dated Jun. 13, 2023.

\* cited by examiner

TECHNIQUE FOR VERIFYING EXPLOIT/MALWARE AT MALWARE DETECTION APPLIANCE THROUGH CORRELATION WITH ENDPOINTS

RELATED APPLICATION

The present application is a continuation of U.S. patent Ser. No. 15/258,656 filed Sep. 7, 2016, now U.S. Pat. No. 10,826,933, which claims the benefit of priority on U.S. Provisional Patent Application No. 62/316,427, entitled TECHNIQUE FOR VERIFYING EXPLOIT/MALWARE AT MALWARE DETECTION APPLIANCE THROUGH CORRELATION WITH ENDPOINTS, filed on Mar. 31, 2016, and from commonly owned U.S. Provisional Patent Application No. 62/316,390, entitled MALWARE DETECTION VERIFICATION AND ENHANCEMENT USING DETECTION SYSTEMS LOCATED AT THE NETWORK PERIPHERY AND ENDPOINT DEVICES, filed on Mar. 31, 2016 the contents of which are incorporated herein by reference.

BACKGROUND

Technical Field

The present disclosure relates to malware detection systems and, more specifically, to verification of exploit or malware at a malware detection system appliance of a network.

Background Information

Data communication in a network involves the exchange of data between two or more entities interconnected by communication links and sub-networks (segments). The entities are typically software processes executing in operating systems of computers, such as end nodes and intermediate nodes. The intermediate nodes interconnect the communication links and segments to enable transmission of data between the end nodes. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broadened their attack to exploit vulnerabilities in processes or applications, such as web browsers. For example, malware content may be embedded within objects associated with a web page hosted by a malicious web site.

Various types of security enhanced nodes, such as security appliances, are often deployed at different segments of the networks. These security appliances often employ virtualization systems to provide the enhanced security needed to uncover the presence of malware embedded within ingress content propagating over the different segments. Specifically, detection at the network periphery may be limited by the capability of the malware detection system for precise and effective detection without excessive false positives (wrongly identified attacks) on the one hand (such as is often the case with intrusion detection systems), and for timely analysis of behaviors of the network traffic to completely prevent network intrusion on the other (such as is typically the case with security appliances). Furthermore, the analysis at the network periphery may not provide sufficient information about the particular target or targets (e.g., endpoints) within the network and the potential scope and severity of an attack. Various types of security appliances typically operate without any mutual relationship or correlation among the virtualization systems. Thus, knowledge of malware identities (i.e., signatures) are typically not shared among the virtualization systems, resulting in untimely and inaccurate determination of whether the ingress content includes malware (i.e., re-identify the malware).

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments herein provide a technique for verifying a determination of an exploit or malware in an object at a malware detection system (MDS) appliance through correlation of activity, i.e., behaviors, of the object running on endpoints of a network. The MDS appliance may be illustratively positioned within the network to intercept communication traffic directed to the endpoints coupled to a segment of the network. The object may be included within, e.g., a payload of a packet associated with the communication traffic. The appliance may analyze the object to render a determination that the object is suspicious and may contain the exploit or malware. In response, the MDS appliance may pull from (e.g., poll) the endpoints or receive a push from (e.g., messages) the endpoints so as to determine whether any of the endpoints may have analyzed the suspect object and observed its behaviors. If the object was analyzed, the endpoints may provide the observed behavior information to the appliance, which may then correlate that information, e.g., against correlation rules, to verify its determination of the exploit or malware. In addition, the appliance may task the endpoints to analyze the object, e.g., during run time, to determine whether it contains the exploit and provide the results to the appliance for correlation. Accordingly, the MDS appliance may verify its determination of an exploit in the object through correlation with the endpoints.

In an embodiment, the appliance may poll a selected group of endpoints in order to collect additional behavior information of the suspect object and correlate that information against a set of correction rules to provide a high level view of the exploit and any potential spreading of the exploit or malware (e.g., as an infection) in the network over the period of time. In another embodiment, the appliance may receive one or more messages from a group of endpoints about the additional behavior information of the suspect object. The set of correlation rules used by the appliance to correlate the behavior information collected from the endpoints may be enhanced to identify a pattern of object activity throughout the network. By collecting additional behavior information from multiple endpoints, the appliance may be provided with a large sampling of sophisticated object activity with which to correlate and obtain a more complete view of the activity pattern. In response to correlation of the behavior information, the appliance may then task one or more endpoints to monitor the suspect object to acquire further behavior information for correlation. The high level view of the exploit and its sophisticated activity and behaviors when running on the endpoints may advantageously enable the appliance to more accurately verify the exploit, e.g., as malware.

Description

Figure 1:
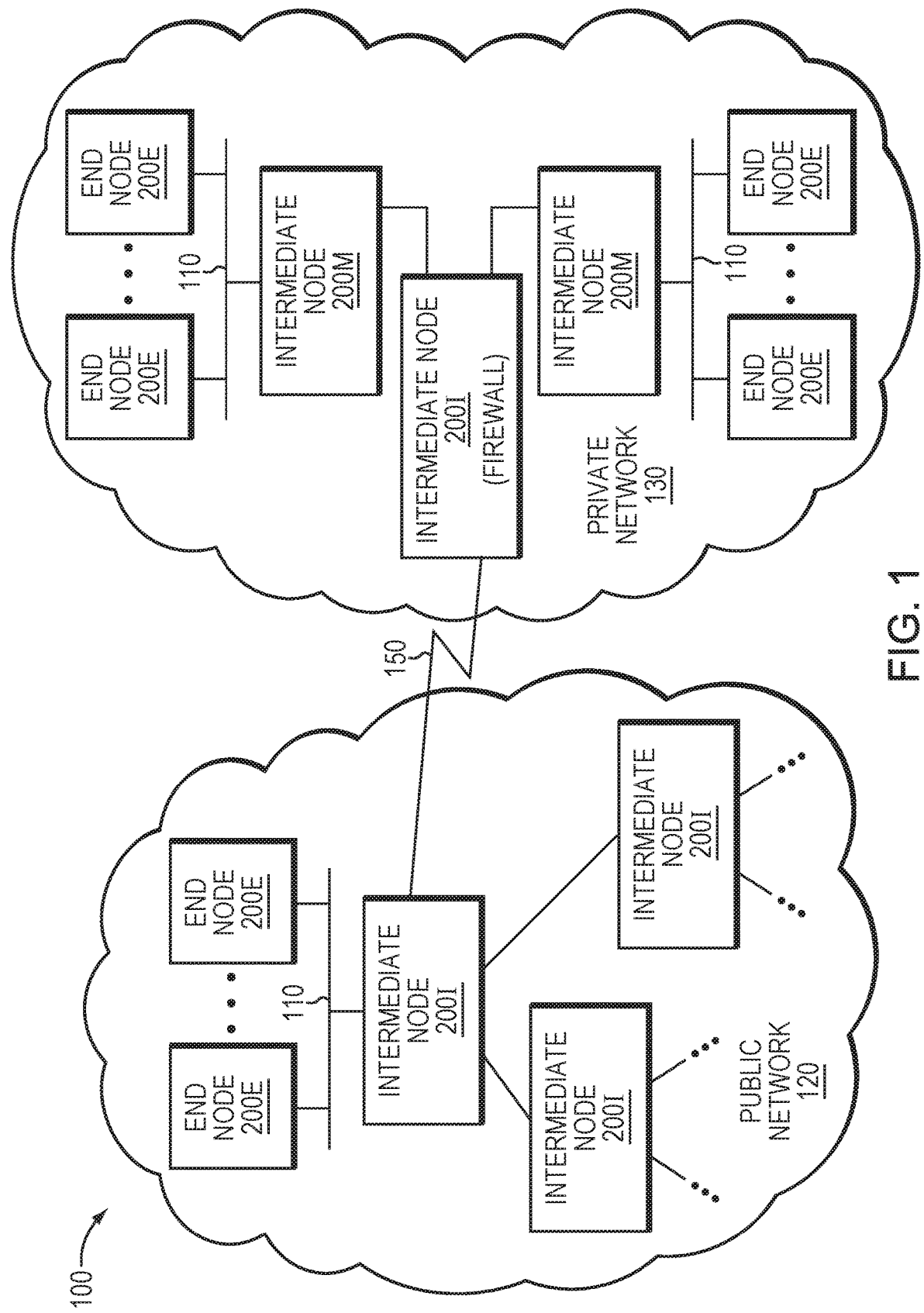
FIG. 1 is a block diagram of a network environment that may be advantageously used with one or more embodiments described herein.

FIG. 1 is a block diagram of a network environment 100 that may be advantageously used with one or more embodiments described herein. The network environment 100 illustratively includes a plurality of networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate nodes $200_M$) described further herein. As used herein, an appliance may be embodied as any type of general-purpose or special-purpose computer, including a dedicated electronic computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints. Further, one or more security information and event manager (SIEM) appliances (not shown) may act as intermediaries for communication between the end nodes and the one or more MDS appliances, so as to facilitate distribution of information between end nodes and the MDS appliances in large scale networks, e.g., networks having a large number (thousands) of end nodes.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., communication traffic) according to a predefined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_I$ may include a firewall or other network device configured to limit or block certain communication (network) traffic in an attempt to protect the endpoints from unauthorized users. Unfortunately, such conventional attempts often fail to protect the endpoints, which may be compromised.

Figure 2:
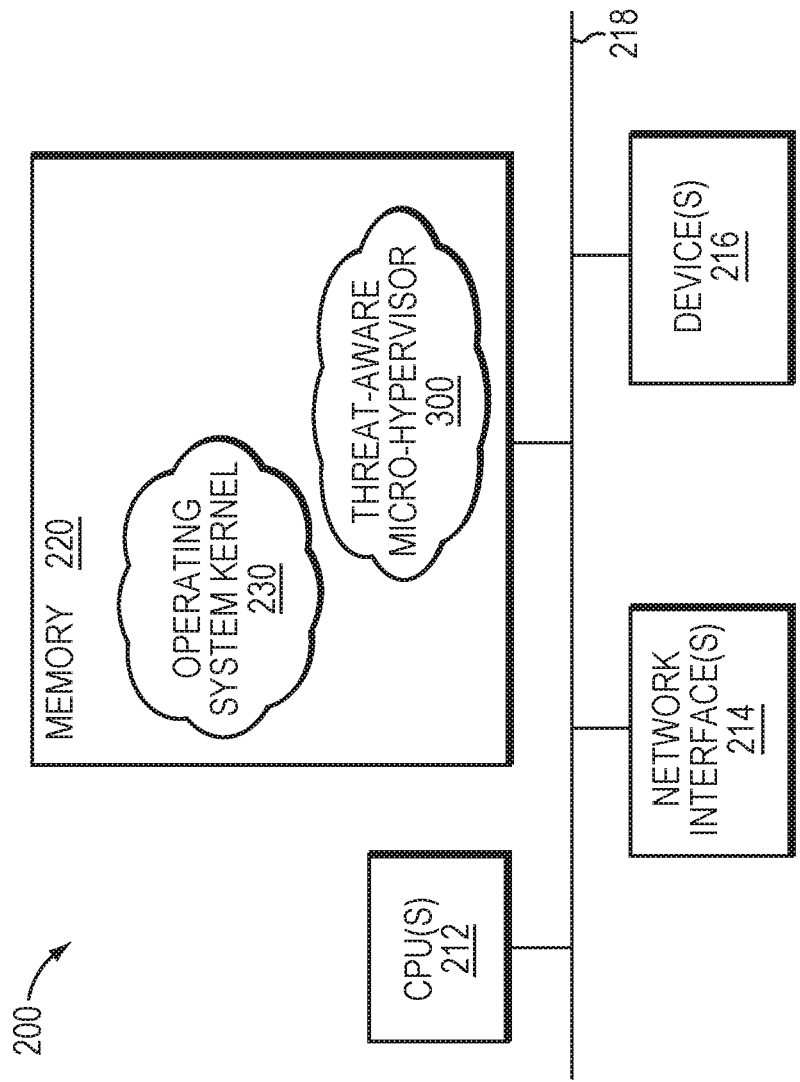
FIG. 2 is a block diagram of a node that may be advantageously used with one or more embodiments described herein.

FIG. 2 is a block diagram of a node 200, e.g., endpoint $200_E$ or MDS appliance $200_M$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may include one or more network ports containing the mechanical, electrical and/or signaling circuitry needed to connect the node to the network 130 to thereby facilitate communication over the network. To that end, the network interface 214 may be configured to transmit and/or receive messages using a variety of communication protocols including, inter alia, TCP/IP and HTTPS.

In one or more embodiments where the MDS appliance $200_M$ is communicatively coupled with the network 130, the network interface 214 may operate as a data capturing device (sometimes referred to as a "tap" or "network tap") that is configured to receive incoming network (data) traffic propagating from public network 120 and into private network 130, and provide at least some of this data traffic or a duplicated copy of the traffic for malware detection. In one embodiment, the MDS appliance may be positioned (deployed) behind the firewall at an ingress point into the private network 130, and at least partially in-line with network devices (e.g., endpoints) so as to capture and analyze the incoming traffic (e.g., through static analysis) and potentially block that traffic which is classified as malware from reaching an internal destination (e.g., the endpoints). In another embodiment, the static analysis may be at least partially performed by the firewall or other intermediate device, or performed by the network interface 214 (e.g., by CPU 212 and/or a digital signal processor on a network interface card).

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as threat-aware micro-hypervisor 300 as well as modules of malware detection architectures described herein, and manipulate the data structures. Exemplary CPUs may include families of instruction set architectures based on the x86 CPU and the x64 CPU.

An operating system kernel 230, portions of which are typically resident in memory 220 and executed by the CPU, functionally organizes the node by, inter alia, invoking operations in support of the software program code and application programs executing on the node. A suitable operating system kernel 230 may include proprietary and open source operating systems from a variety of commercial vendors or available publicly. Suitable application programs may include internet browsers, document viewers or browsers, word processors, email clients and the like as is known to persons of skill in the art. Illustratively, the software program code may be implemented as operating system processes of the kernel 230. As used herein, a process (e.g., a user mode process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application, programs stored in memory, alternative embodiments also include the code, processes and programs being embodied as engines and/or modules consisting of hardware, software, firmware, or combinations thereof.

Threat-Aware Micro-Hypervisor

Figure 3:
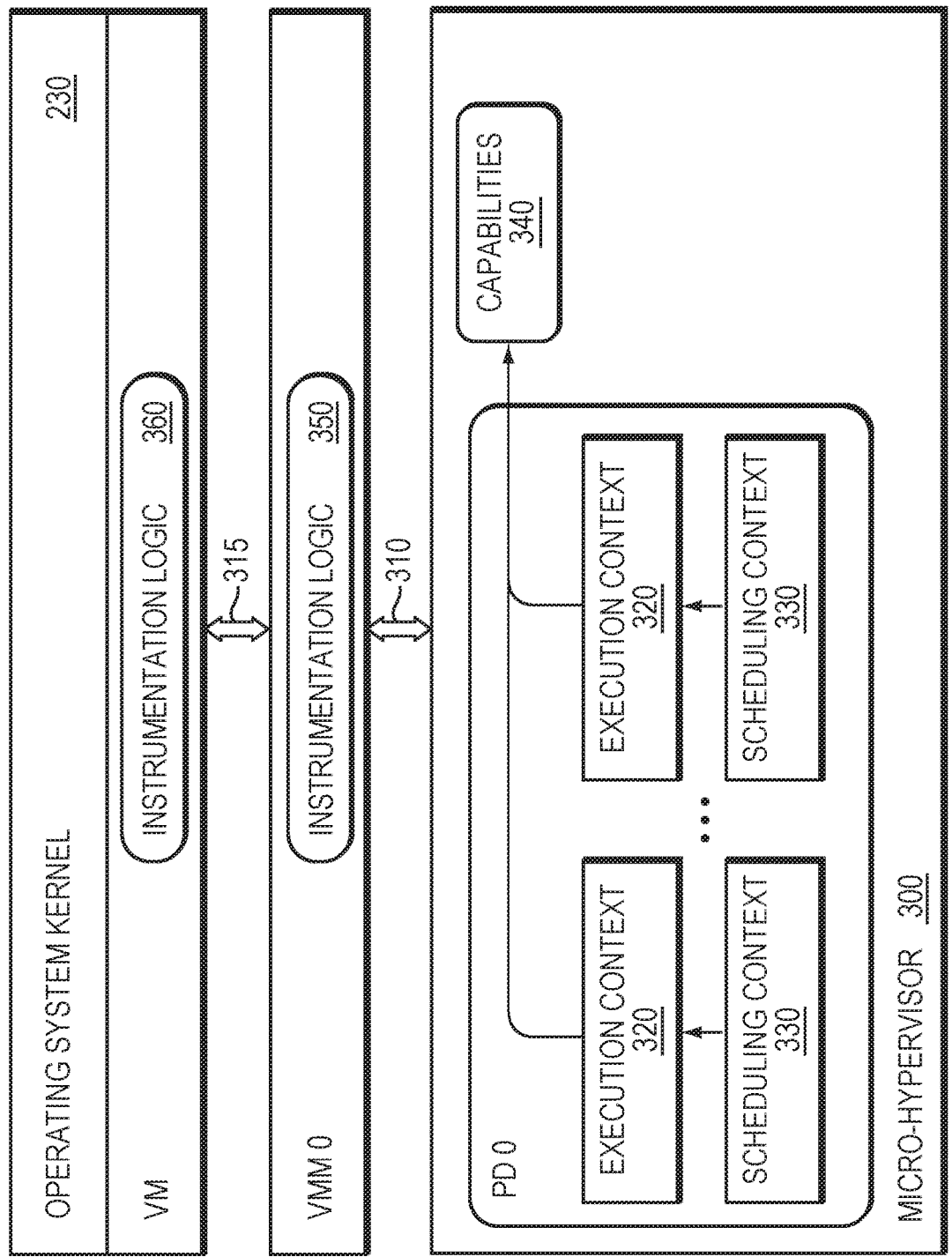
FIG. 3 is a block diagram of the threat-aware microhypervisor that may be advantageously used with one or more embodiments described herein.

FIG. 3 is a block diagram of the threat-aware micro-hypervisor 300 that may be advantageously used with one or more embodiments described herein. The threat-aware micro-hypervisor may be configured to facilitate run-time security analysis, including exploit and malware detection and threat intelligence, of operating system processes executing on the node 200. To that end, the micro-hypervisor may be embodied as a light-weight module disposed or layered beneath (underlying, i.e., directly on native hardware) the operating system kernel 230 of the node to thereby virtualize the hardware and control privileges (i.e., access control permissions) to kernel (e.g., hardware) resources of the node 200 that are typically controlled by the operating system kernel. Illustratively, the kernel resources may include (physical) CPU(s) 212, memory 220, network interface(s) 214, and devices 216. The micro-hypervisor 300 may be configured to control access to one or more of the resources in response to a request by an operating system process to access the resource.

As a light-weight module, the micro-hypervisor 300 may provide a virtualization layer having less functionality than a typical hypervisor. Therefore, as used herein, the micro-hypervisor 300 is a module (component) that underlies the operating system kernel 230 and includes the functionality of a micro-kernel (e.g., protection domains, execution contexts, capabilities and scheduling), as well as a subset of the functionality of a hypervisor (e.g., hyper-calls to implement a virtual machine monitor). Accordingly, the micro-hypervisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM. VMM 0 may thus instantiate the VM as a container for the operating system kernel 230 and its kernel resources. In an embodiment, VMM 0 may instantiate the VM as a module having instrumentation logic 360 directed to determination of an exploit or malware in any suspicious operating system process (kernel or user mode). Illustratively, VMM 0 is a pass-through module configured to expose the kernel resources of the node (as controlled by micro-hypervisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., the VM) and the micro-hypervisor over privileged interfaces 315 and 310.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the micro-hypervisor, VMM 0 or another virtual machine. Illustratively, VMM 0 may contain computer executable instructions executed by the CPU 212 to perform operations that initialize and implement the instrumentation logic 350, as well as operations that spawn, configure, and control/implement the VM and its instrumentation logic 360.

In an embodiment, the micro-hypervisor 300 may be organized to include a protection domain illustratively bound to the VM. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process) and, thus, is a representation of the process. Accordingly, the micro-hypervisor may provide a protection domain for the process and its run-time threads executing in the operating system. A main protection domain (PD 0) of the micro-hypervisor controls all of the kernel resources available to the operating system kernel 230 (and, hence, the user mode process) of the VM via VMM 0 and, to that end, may be associated with the services provided to the user mode process by the kernel 230.

An execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. A violation of a capability in a protection domain may be an interception point, which returns control to the VM bound to the protection domain.

Malware Detection Endpoint Architecture

Figure 4:
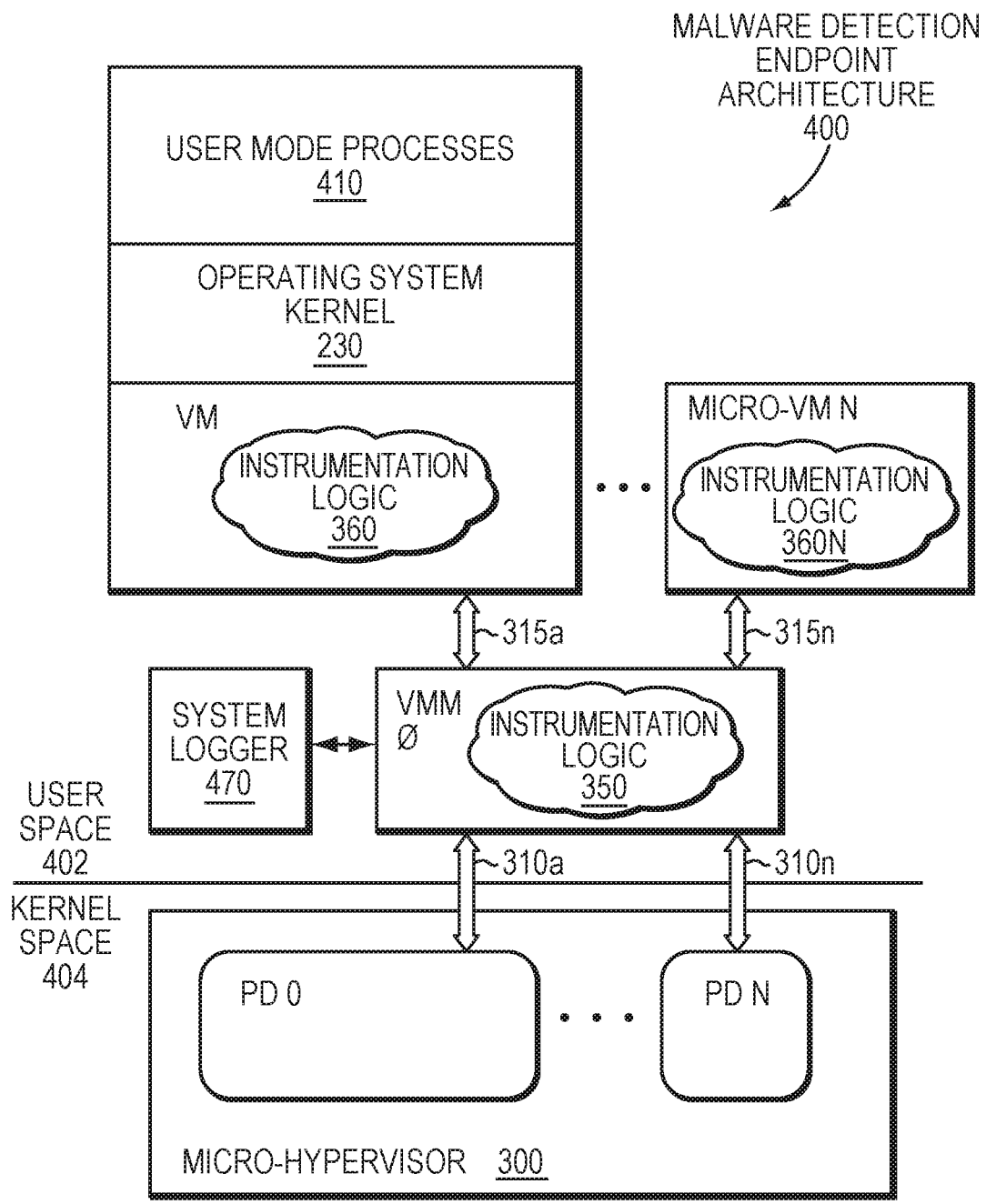
FIG. 4 is a block diagram of a malware detection endpoint architecture that may be advantageously used with one or more embodiments described herein.

In an embodiment, the threat-aware micro-hypervisor 300 may be deployed in a micro-virtualization architecture as a module of a virtualization system executing on the endpoint 200$_E$ to provide exploit and malware detection within the network environment 100. FIG. 4 is a block diagram of a malware detection endpoint architecture 400 that may be advantageously used with one or more embodiments described herein. Illustratively, the architecture 400 may organize the memory 220 of the endpoint 200$_E$ as a user space 402 and a kernel space 404. In an embodiment, the micro-hypervisor may underlie the operating system kernel 230 and execute in the kernel space 404 of the architecture 400 to control access to the kernel resources of the endpoint 200$_E$ for any operating system process (kernel or user mode). Notably, the micro-hypervisor 300 executes at the highest privilege level of the hardware (CPU) to thereby virtualize access to the kernel resources of the endpoint in a light-weight manner that does not share those resources among user mode processes 410 when requesting the services of the operating system kernel 230. That is, there is one-to-one mapping between the resources and the operating system kernel, such that the resources are not shared.

A system call illustratively provides an interception point at which a change in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the micro-hypervisor to detect anomalous behavior which may be used in determining an exploit or malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device (such as a node) and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe any technique that causes a malicious attack, and encompasses both malicious code and exploits detectable in accordance with the disclosure herein.

As used herein, the term "micro" VM denotes a virtual machine serving as a container that is restricted to a process (as opposed to the VM which is spawned as a container for the entire operating system). Such spawning of a micro-VM may result in creation of an instance of another module (i.e., micro-VM N) that is substantially similar to the VM, but with different (e.g., additional) instrumentation logic 360N illustratively directed to determination of an exploit or malware in the suspicious process by, e.g., monitoring its behavior. In an embodiment, the spawned micro-VM illustratively encapsulates an operating system process, such as a user mode process 410. A micro-VM may also be embodied as a memory view (as described herein). In terms of execution, operation of the process is controlled and synchronized by the operating system kernel 230; however, in terms of access to kernel resources, operation of the encapsulated process is controlled by VMM 0. Notably, the resources appear to be isolated within each spawned micro-VM such that each respective encapsulated process appears to have exclusive control of the resources. In other words, access to kernel resources is synchronized among the micro-VMs and the VM by VMM 0 rather than virtually shared. Similar to the VM, each micro-VM may be configured to communicate with the micro-hypervisor (via VMM 0) over privileged interfaces (e.g., 315$n$ and 310$n$).

Whereas a micro-VM may be restricted to a guest process, the hardware resources used by that micro-VM, such as memory, may be accessed by a plurality of micro-VMs (and their respective guest processes). As noted, there is only one virtual machine (e.g., the VM) per guest operating system on the endpoint. Typically, the guest operating system running in the VM has one "view" of the memory 220, i.e., "guest-physical" memory (memory appearing as physical within the VM), corresponding to a memory management unit page table of the CPU 212 that provides access to the guest-physical memory as seen by that guest operating system running in the VM. Accordingly, a same page table (i.e., memory view) may be used by a plurality of guest processes, each contained in a separate corresponding micro-VM (i.e., memory view) that uses a same page table. However, additional views of memory may be created for each guest process, such as where every view corresponds to a different (i.e., separate) nested page table. Thus, different guest processes may view the guest-physical memory differently (e.g., with different translations or different permissions to the actual memory 220).

In an embodiment, the privileged interfaces 310 and 315 may be embodied as a set of defined hyper-calls, which are illustratively inter process communication (IPC) messages exposed (available) to VMM 0 and the VM (including any spawned micro-VMs). The hyper-calls are generally originated by VMM 0 and directed to the micro-hypervisor 300 over privileged interface 310, although the VM and the micro-VMs may also originate one or more hyper-calls (IPC messages) directed to the micro-hypervisor over privileged interface 315. However, the hyper-calls originated by the VM and the micro-VMs may be more restricted than those originated by VMM 0.

In an embodiment, the micro-hypervisor 300 may be organized to include a plurality of protection domains (e.g., PD 0-N) illustratively bound to the VM and one or more micro-VMs, respectively. For example, the spawned micro-VM (e.g., micro-VM N) is illustratively associated with (bound to) a copy of PD 0 (e.g., PD N) which, in turn, may be bound to the process, wherein such binding may occur through memory context switching. In response to a decision to spawn the micro-VM N, VMM 0 may issue a hyper-call over interface 310 to the micro-hypervisor requesting creation of the protection domain PD N. Upon receiving the hyper-call, the micro-hypervisor 300 may copy (i.e., "clone") the data structures (e.g., execution contexts, scheduling contexts and capabilities) of PD 0 to create PD N for the micro-VM N, wherein PD N has essentially the same structure as PD 0 except for the capabilities associated with the kernel resources. The capabilities for PD N may limit or restrict access to one or more of the kernel resources as instructed through one or more hyper-calls from, e.g., VMM 0 and/or micro-VM N over interface 310n to the micro-hypervisor. Accordingly, the micro-hypervisor 300 may contain computer executable instructions executed by the CPU 212 to perform operations that initialize, clone and configure the protection domains.

Advantageously, the micro-hypervisor 300 may be organized as separate protection domain containers for the operating system kernel 230 (PD 0) and one or more operating system processes (PD N) to facilitate further monitoring and/or understanding of behaviors of a process and its threads. Such organization of the micro-hypervisor also enforces separation between the protection domains to control the activity of the monitored process. Moreover, the micro-hypervisor 300 may enforce access to the kernel resources through the use of variously configured capabilities of the separate protection domains. Unlike previous virtualization systems, separation of the protection domains to control access to kernel resources at a process granularity enables detection of anomalous behavior of an exploit or malware. That is, in addition to enforcing access to kernel resources, the micro-hypervisor enables analysis of the operation of a process within a spawned micro-VM to detect exploits or other malicious code threats that may constitute malware.

The user mode processes 410 and operating system kernel 230 may execute in the user space 402 of the endpoint architecture 400, although it will be understood to those skilled in the art that the user mode processes may execute in another address space defined by the operating system kernel. Illustratively, the operating system kernel 230 may execute under control of the micro-hypervisor at a privilege level (i.e., a logical privilege level) lower than a highest privilege level of the micro-hypervisor, but at a higher CPU privilege level than that of the user mode processes 410. In addition, VMM 0 and its spawned VMs (e.g., the VM and micro-VM N) may execute in user space 402 of the architecture 400. As a type 0 virtual machine monitor, VMM 0 (and its spawned VM and micro-VMs) may execute at the highest (logical) privilege level of the micro-hypervisor. That is, VMM 0 (and its spawned VM and micro-VMs) may operate under control of the micro-hypervisor at the highest micro-hypervisor privilege level, but may not directly operate at the highest CPU (hardware) privilege level.

Illustratively, the instrumentation logic of VMM 0 (and its spawned micro-VMs) may include monitoring logic configured to monitor and collect capability violations (e.g., generated by CPU 212) in response to one or more interception points to thereby infer an exploit or malware. Inference of an exploit or malware may also be realized through sequences of interception points wherein, for example, a system call followed by another system call having certain parameters may lead to an inference that the process sending the calls is an exploit or malware. The interception point thus provides an opportunity for VMM 0 to perform "light-weight" (i.e., limited so as to maintain user experience at the endpoint with little performance degradation) analysis to evaluate a state of the process in order to detect a possible exploit or malware without requiring any policy enforcement. VMM 0 may then decide to spawn a micro-VM and configure the capabilities of its protection domain to enable deeper monitoring and analysis (e.g., through interception points and capability violations) in order to determine whether the process is an exploit or malware. Notably, the analysis may also classify the process as a type of exploit (e.g., a stack overflow) or as malware and may even identify the same. As a result, the invocation of instrumentation and monitoring logic of VMM 0 and its spawned VMs in response to interception points originated by operating system processes and capability violations generated by the micro-hypervisor advantageously enhance the virtualization system described herein to provide an exploit and malware detection system configured for run-time security analysis of the operating system processes executing on the endpoint.

VMM 0 may also log the state of the monitored process within system logger 470. In an embodiment, the state of the process may be realized through the contents of the execution context 320 (e.g., CPU registers, stack, program counter, and/or allocation of memory) executing at the time of each capability violation. In addition, the state of the process may be realized through correlation of various activities or behavior of the monitored process. The logged state of the process may thereafter be exported from the system logger 470 to the MDS $200_M$ of the network environment 100 by, e.g., forwarding the state as one or more IPC messages through VMM 0 (VM) and onto a network protocol stack (not shown) of the operating system kernel. The network protocol stack may then format the messages as one or more packets according to, e.g., a syslog protocol such as RFC 5434 available from IETF, for transmission over the network to the MDS $200_M$.

Malware Detection Appliance Architecture

In one or more embodiments, the MDS appliance node (MDS) $200_M$ may be embodied as an intermediate node configured to analyze communication traffic associated with one or more endpoints $200_E$ coupled to a segment of a network, such as private network 130. The MDS appliance $200_M$ may be illustratively positioned (e.g., as an ingress/egress point) within the private network 130 or segment to intercept (i.e., snoop) the traffic. In one or embodiments, the MDS appliance may manage each endpoint by, e.g., requesting processing and instrumentation of the traffic by the endpoint $200_E$. The intercepted traffic may also be processed and instrumented (i.e., monitored) at the appliance. Thereafter, the instrumented traffic may be correlated at the MDS appliance $200_M$ to communicate the states of instrumentation between the endpoint $200_E$ and appliance. Note that such communication between the endpoint and MDS appliance may occur directly or indirectly via the SIEM acting as an intermediary. To that end, the MDS appliance may be configured to communicate with and instruct the endpoint to, e.g., perform an action and receive notification of that action. In an embodiment the MDS appliance may direct one or more endpoints to spawn a micro-VM having restricted capabilities (i.e., a restrictive memory view) to process and instrument the intercepted traffic and report results back (e.g., communicate collected states) to the MDS appliance. That is, the MDS appliance may determine that the intercepted traffic having a specific signature is potentially malicious and instruct the endpoint to process and instrument traffic matching that signature in a restrictive memory view. An example MDS appliance is described in U.S. patent application Ser. No. 14/962,497 titled Microvisor-Based Malware Detection Appliance Architecture, by Ismael, filed Dec. 8, 2015, which application is hereby incorporated by reference.

Illustratively, the MDS appliance $200_M$ may include functionality directed to processing of communication traffic and correlating instrumentation of that traffic with actions resulting from that traffic at the endpoints. For every network packet received, the appliance may run a heuristic to compute a flow, as appropriate, for the packet, and then create (spawn) a virtual machine (VM) to emulate an endpoint using an image of an operating system (guest operating system and one or more applications) configured to replicate a software processing environment of the endpoint, e.g., based on a payload (object) of the packet to be processed and instrumented. An object may include a logical entity such as, for example, a web page, an email or email attachment, an executable (i.e., binary or script), a file (which may contain an executable), or universal resource locator (URL). Information as to an appropriate processing environment may be provided by the packet itself, e.g., the packet header may identify the packet type, for example, a document such as a Portable Document Format (PDF) document and, thus, the processing environment may include a document reader. Additionally, or in alternative embodiments, information may also be provided by the endpoint (such as the destination endpoint as specified in the packet) to the MDS appliance indicating a type of application software (process) executing within the operating system on the endpoint. The appliance may then launch a copy of the application along with appropriate instrumentation to process each object. For example, assume the MDS appliance process HTTPS traffic received at the endpoint which executes, inter alia, an application (i.e., a web browser). The appliance may capture the communication (HTTPS) traffic destined to the endpoint, spawn the VM and launch a copy of the web browser along with instrumentation to monitor the traffic. Thereafter, the MDS appliance may communicate the state of the instrumentation to the endpoint, depending upon the captured traffic.

Figure 5:
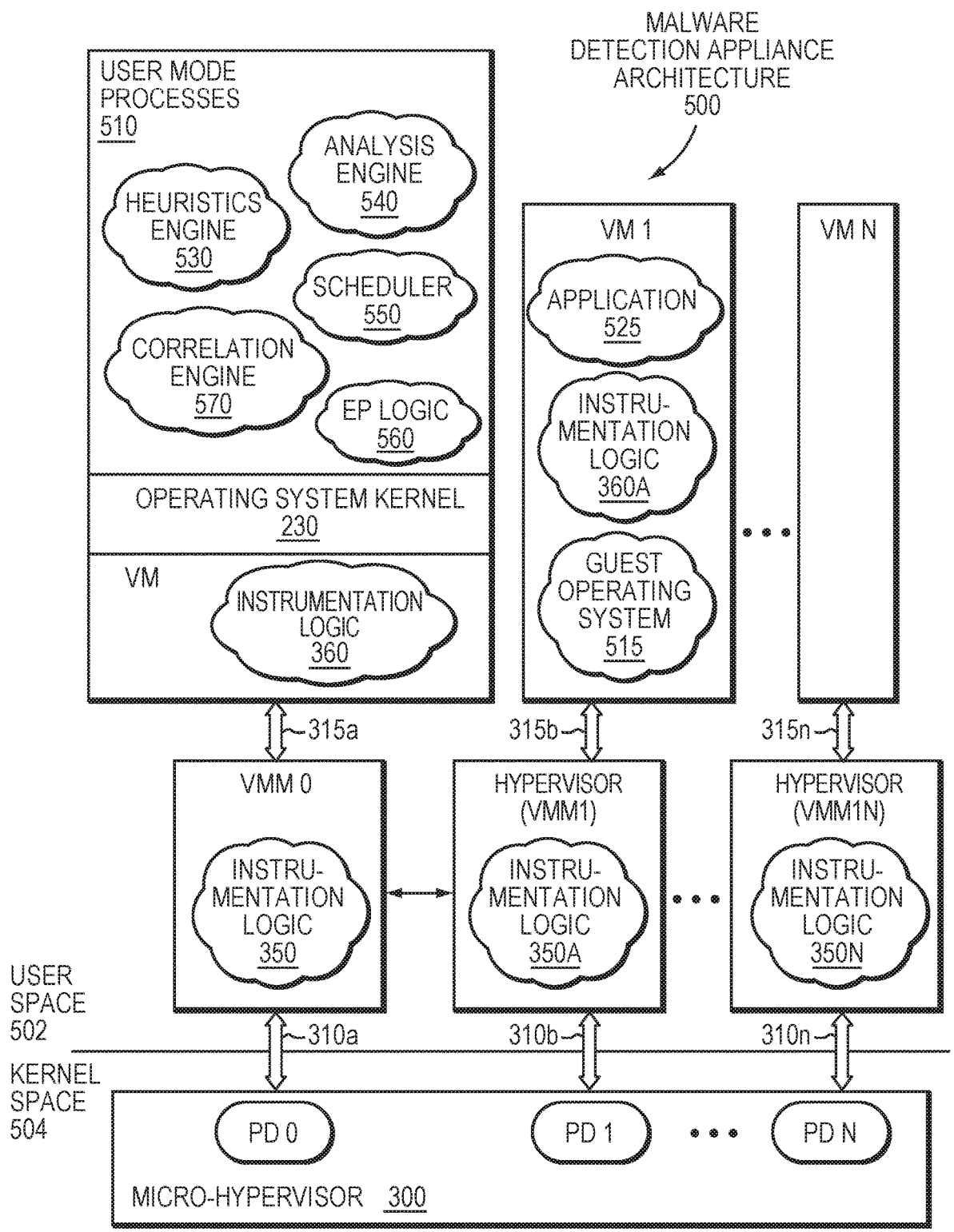
FIG. 5 is a block diagram of a malware detection appliance architecture that may be advantageously used with one or more embodiments described herein.

In an embodiment, the threat-aware micro-hypervisor 300 may be deployed in a virtualization architecture as a module of a virtualization system executing on the MDS appliance $200_M$ to provide exploit and malware detection within the network environment 100. FIG. 5 is a block diagram of a malware detection appliance architecture 500 that may be advantageously used with one or more embodiments described herein. Illustratively, the architecture 500 may organize the memory 220 of the MDS appliance $200_M$ as a user space 502 and a kernel space 504. The micro-hypervisor may underlie the operating system kernel 230 and execute at the highest privilege level of the CPU within the kernel space 504 of the architecture 500 to control access to the kernel resources of the appliance $200_M$ for any operating system process (kernel or user mode). User mode processes 510 and operating system kernel 230 may execute in the user space 502 of the appliance architecture 500. Illustratively, the operating system kernel 230 may execute under control of the micro-hypervisor at a privilege level (i.e., a logical privilege level) lower than a highest privilege level of the micro-hypervisor, but at a higher CPU privilege level than that of the user mode processes 510. In addition, VMM 0 and VM (e.g., VM) may execute in user space 502 under control of the micro-hypervisor at the highest micro-hypervisor privilege level, but may not directly operate at the highest CPU (hardware) privilege level.

One or more hypervisors, e.g., type 1 VMM (e.g., VMM 1), may be disposed as one or more modules over the micro-hypervisor 300 and operate in user space 502 of the architecture 500 under control of the micro-hypervisor at the highest micro-hypervisor privilege level to provide additional layers of virtualization for the MDS appliance $200_M$. Illustratively, each hypervisor provides full virtualization of kernel (hardware) resources and supports execution of one or more entire operating system instances (i.e., guest operating system) inside one or more full virtual machines. In one or more embodiments, the full virtual machine (VM) may simulate a computer (machine) based on specifications of a hypothetical (abstract) computer or based on an architecture and functions of an actual (real) computer. To that end, a hypervisor (e.g., VMM 1) may instantiate a full VM (e.g., VM 1) as a module provisioned with a software profile that includes a guest operating system (e.g., guest operating system 515) and any associated application programs (e.g., application 525), as well as instrumentation logic (e.g., instrumentation logic 360A) directed to determination of an exploit or malware in any suspicious object or application executing on the guest operating system. Illustratively, the hypervisor may instantiate the full VM from a pool of VMs configured to closely simulate various target operating environments (e.g., software profiles) in which the exploit or malware is to be analyzed. The software profile (e.g., guest operating system and/or application program) provisioned and configured in the VM may be different (e.g., in vendor, type and/or version) from the software profile provisioned and configured in other instantiated VMs (e.g., VM N).

Illustratively, each hypervisor (e.g., VMM $1\text{-}1_N$) may contain computer executable instructions executed by the CPU 212 to perform operations that initialize and configure the instrumentation logic (e.g., instrumentation logic 350A-N), as well as operations that spawn, configure, and control/implement the VM (e.g., VM 1-N) and their instrumentation logic (e.g., 360A-N). In an embodiment, there is illustratively one hypervisor (e.g., VMM $1\text{-}1_N$) for each VM (e.g., VMs 1-N), wherein each VM may be used to emulate an endpoint. The MDS appliance $200_M$ may not emulate every endpoint on the segment, but when a suspicious object (such as, e.g., a file of a network packet) is identified, the VMM 1 of the appliance may create (spawn) a full VM 1 to analyze that object. The virtualization layers of the MDS appliance $200_M$ may cooperate to implement an abstraction of virtual devices exposed as, e.g., virtual network interfaces to the VMs, as opposed to the real network interfaces exposed to the micro-VMs of the endpoint.

The user mode processes 510 executing on the MDS appliance $200_M$ may include a heuristic engine 530 that, in response to receiving communication traffic, is configured to run one or more heuristics to determine whether the traffic (i.e., an object of a packet) is suspicious. Illustratively, the heuristic engine may use pre-defined anomalous characteristics of verified exploits and malware to, e.g., identify communication protocol anomalies and/or suspect source addresses of known malicious servers. For example, the heuristic engine may examine metadata or attributes of the object and/or a code image (e.g., a binary image of an executable) of the object to determine whether a portion of the object matches a predetermined pattern or signature associated with a known type of exploit or malware. The heuristic engine 530 may provide the packet of the suspicious traffic to one or more processes 510 embodied as analysis engine 540. In an embodiment, the analysis engine 540 may be configured to perform static analysis of the object of the packet to, e.g., identify software profile information associated with an operating system instance for execution in a full VM (virtualizing all kernel resources). The analysis engine 540 may also be configured to analyze other content of the packet (e.g., destination address of a network header) to determine its destination (i.e., the endpoints). To that end, the analysis engine 540 may be configured to cooperate with a module, e.g., endpoint (EP) logic 560, to communicate to the endpoints $200_E$, e.g., to identify and/or acquire information (including the software profile) associated with execution of the exploit or malware on the endpoint. The analysis engine 540 may then provide the software profile information to another process embodied as scheduler 550, which may coordinate with the hypervisor, e.g., VMM 1, to spawn a VM, e.g., VM 1, to process the traffic. Note that the MDS appliance may instruct the endpoint to process the object in a micro-VM as soon as suspicion of the object as malware exceeds a pre-determined threshold.

When processing the traffic, the analysis engine 540 may employ the EP logic 560 to invoke appropriate instrumentation logic 360A of VM 1 to enable communication with the endpoints to perform dynamic analysis and/or correlation of the suspicious object. In an embodiment, correlation (as described herein) may be performed by one or more user mode processes embodied as a correlation engine 570. The instrumentation logic 360A may be configured to monitor different types of objects, such as payloads of network (web) and email packets, although alternatively, there could be separate web-based and email-based MDS appliances, each of which may be deployed the same way and configured to perform that same work. The MDS appliance $200_M$ may include a module that communicates with a similar module on the endpoint to perform the requested instrumentation. For example in the case of email objects, the application may be an email reader that analyzes email traffic captured by the appliance (and endpoint).

Operationally, the MDS appliance may receive (i.e., intercept) and store traffic flowing over the network that is destined to the endpoints. The appliance may analyze the traffic and communicate with the endpoints over the network using a messaging protocol that encapsulates an object of interest (e.g., a file of a network packet). Illustratively, the MDS appliance may deploy a network protocol stack, e.g., of the operating system kernel 230 configured to employ a protocol to communicate with the endpoints. For example, the EP logic 560 may notify an endpoint to process the object using a network message having a MAC address of the endpoint (layer 2 connectivity). Alternatively, the message may include an IP address of the endpoint (layer 3 connectivity).

Correlation Between MDS Appliance and Endpoints

The embodiments herein provide a technique for verifying a determination of an exploit or malware in an object at the MDS appliance $200_M$ through correlation of activity, i.e., behaviors, of the object running on endpoints $200_E$ of the network. As noted, the MDS appliance may be illustratively positioned within the network to intercept communication traffic directed to the endpoints coupled to a segment of the network. The object may be included within, e.g., a payload of a packet associated with the communication traffic. The appliance may analyze the object to render a determination that the object is suspicious and may contain the exploit or malware. In response, the MDS appliance $200_M$ may pull from the endpoints (e.g., poll the endpoints to inquire) or receive a push (e.g., messages from the endpoints) as to whether any of the endpoints may have analyzed the suspect object and observed its behaviors. As noted previously, communication between the endpoints and the MDS appliance may occur directly or indirectly via the SIEM appliance that gathers events (e.g., messages) for bidirectional distribution to/from the MDS appliance and the endpoints.

In an embodiment, each endpoint $200_E$ may maintain a history of object behaviors (e.g., in system logger 470) that have been analyzed (i.e., monitored) and observed over a period of time (e.g., minutes or hours). The analyzed object behaviors (behavior information) may include inferences of the object as a type of exploit or malware, as well as evaluations of states of the object leading to a determination of the exploit or malware. The MDS appliance $200_M$ may poll the endpoints for their histories of behavior information associated with the suspect object. Alternatively, the appliance may receive one or more messages from a group of endpoints about their histories of behavior information associated with the suspect object. If the object's behaviors were analyzed and observed, the endpoints may provide the behavior information to the appliance, which may then invoke the correlation engine 570 to correlate that information, e.g., against correlation rules, to verify its determination of the exploit or malware. In addition, the appliance may task the endpoints to analyze the object, e.g., during run time, to determine whether it contains the exploit and provide the results to the appliance for correlation. Accordingly, the MDS appliance may verify its determination of an exploit within the object by correlating with the endpoints. Notably, SIEM appliance may correlate with the endpoints and communicate with the MDS so as to verify its determination of an exploit within the object.

Advantageously, maintaining a history of object behaviors enables verification (or validation) of states of the activity, e.g., of an object, that has been observed in the past. For example, assume that the micro-hypervisor and micro-VM allow an exploit or malware (within an object) to execute and analyze the object to observe that it has manifested certain states, e.g., creation of one or more files. The exploit or malware may thus be validated and observed using a generated signature of the exploit or malware. Upon obtaining sufficient information or completing the analysis, resources used to process the object at the micro-VM may be reallocated because there may be other objects, such as files of packets that need analysis. Details of the states and behavior of the objects (files) may be recorded in the system logger 470 to thereby maintain a robust identifier and/or signature for the exploit or malware (object), as well as obtain improved forensic information.

In an embodiment, the MDS appliance $200_M$ may poll a selected group of endpoints $200_E$ in order to collect additional behavior information of the suspect object and correlate that information against a set of correction rules of the correlation engine 570 to provide a high level view of the exploit and any potential spreading of the exploit or malware (e.g., as an infection) in the network over the period of time. In another embodiment, the appliance may receive one or more messages from a group of endpoints about the additional behavior information of the suspect object. Such correlation may not be performed at a single endpoint because the views (histories) from many endpoints may be needed to detect a particular type of exploit as it progresses through various stages of behaviors. The high level view of the potential infection from the perspective of multiple endpoints may be needed to detect whether the object contains an exploit or malware. The set of correlation rules employed by the correlation engine 570 to correlate the behavior information collected from the endpoints may be enhanced to identify a pattern of object activity, e.g., a multi-phase attack, throughout the network. Often, an endpoint may experience only part of the multi-phased network attack by an object among many endpoints. For example, an exploit may exhibit delayed activation where one endpoint did not observe any manifestations of the attack by the object, while another endpoint may observe anomalous (malicious) behaviors of the exploit during analysis of the object. By collecting additional behavior information from multiple endpoints, the appliance $200_M$ may be provided with a large sampling of sophisticated object activity with which to correlate and obtain a more complete view of the activity pattern. In response to correlation of the behavior information, the appliance may then task one or more endpoints $200_E$ to monitor (instrument) the suspect object to acquire further behavior information for correlation and determination of the exploit.

The high level view of the exploit and its sophisticated activity and behaviors when running on the endpoints may advantageously enable the appliance $200_M$ to more accurately verify the exploit, e.g., as malware. As noted, correlation of behavior information of the object from many endpoints provides the appliance with more knowledge of the exploit and its potential to execute malware. The additional knowledge may lead the appliance to task those endpoints to provide even more information relating to specific events associated with the behavior of the object. Since an endpoint only has a "local" view of the object's behavior, the appliance may task the endpoints to monitor events and notify the appliance as to the observed behavior in response to those events.

As described herein, the micro-hypervisor 300 may be employed to detect unexpected behavior (or actions) by one or more operating system processes (e.g., application and/or object) executing in the operating system kernel 230 of the MDS appliance $200_M$ or endpoint $200_E$. The unexpected behavior of the process may be further tracked as suspicious. In response to a task, the micro-hypervisor 300 (via VMM 0 and a spawned micro-VM) of the endpoint may report to the MDS appliance that it has detected and identified an exploit or malware. Unlike VMM 0 which spawns the micro-VM as a container for light-weight (i.e., limited so to maintain user experience) analysis of the process, the MDS appliance $200_M$ includes full virtualized hardware via the hypervisor (VMM 1) that spawns a full (i.e., virtualizing all kernel resources) VM used to analyze the behavior of the operating system process executing on the endpoint. That is, the MDS appliance $200_M$ may be employed to provide more extensive instrumentation than can be provided by VMM 0 and its micro-VM of the endpoint.

In an embodiment, each VM of the appliance may include instrumentation logic (e.g., instrumentation logic 360A-N) having an instrumentation package that includes monitors although, in an alternative embodiment, the instrumentation package may be part of VMM 1. In terms of implementation, different types of instrumentation can attach to the VM. The VM may also be able to dynamically switch between different types of instrumentation at the appliance. Assume a particular type of instrumentation is executing that is relevant to a particular analysis. Subsequently, it may be determined that the instrumentation is not relevant and that some other instrumentation is desired, so the state of the analysis may continue but with a different type of instrumentation. Illustratively, a monitor is a type of instrumentation that monitors the behavior of software code at the micro-hypervisor level.

In an embodiment, the MDS appliance $200_M$ may be located at a periphery of the network, e.g., private network 130, or sub-network (segment) of the network. The location of the appliance may hinder its visibility to peer-to-peer communication traffic among the endpoints $200_E$. The lack of visibility may lead to spreading of the exploit (infection) among the endpoints where an initial infection at one endpoint may propagate among the other communicating endpoints. The initial infection may penetrate the network to one or more endpoints if it is not detected using, e.g., anti-virus (AV) signatures (indicators), exploit indicators and/or other behavioral indicators at the appliance. Once the infection penetrates the network (e.g., past the peripheral-based appliance $200_M$) the exploit may disrupt operation of the network. The verification technique described herein may obviate (prevent) any lateral propagation of the infection among the endpoints by enhancing the visibility of the exploit (e.g., its activity when running in the object) at the appliance $200_M$.

For example, upon verifying the exploit or malware in the object, the appliance may instruct the endpoints to terminate execution of the object and/or an associated operating system process containing the exploit. In response, the micro-hypervisor 300 of each endpoint may prevent lateral propagation of the infection by, e.g., closing network ports and terminating communication with other endpoints and appliances in the private network 130, and/or reporting an alert to an administrator (management) station of the network. Illustratively, the micro-hypervisor 300 may close network ports of the network interfaces 214 (kernel resources) by, e.g., closing any active programs using the ports to thereby terminate communication (i.e., the exchange of information) external to the endpoint. Alternatively, the management station may command the endpoint (via the micro-hypervisor) to terminate external communication in response to the alert (and until the endpoint is "cleansed"). The micro-hypervisor 300 may terminate such communication because of its fine-grained control over the kernel resources. For instance, the micro-hypervisor may terminate a malignant operating system process (or object) by, e.g., removing the process and its associated process control block from a process table.

The MDS appliance $200_M$ may seek further verification of the determination of the infection by tasking one or more selected endpoints $200_E$ running a type of potentially vulnerable software or having characteristics that may otherwise render the endpoints interesting to perform monitoring of the object. For example, an endpoint may be more isolated than other endpoints in the network so an infection may not spread as quickly, if at all. Alternatively, the endpoint may be located in a department of the private network or enterprise (e.g., a financial department) where advanced persistent threats (APTS) may be more prone to access sensitive information (e.g., a financial database). The MDS appliance $200_M$ may instruct the endpoints to monitor the object to detect and observe the exploit (or malware) as it runs (manifests) at the endpoints and then control (e.g., terminate) the infection to prevent lateral spreading among endpoints in the network.

In an embodiment, intelligence may be imparted into the selection of endpoints $200_E$ for verification, wherein the intelligence may include different software profiles such as different types of operating systems (with certain service packs) and/or different types of application programs executing on the endpoints that an exploit or malware of an object may be known to attack. In addition, such intelligence may determine whether identified exploit or malware may attack more than one type of vulnerability in an application executing the object on the endpoints. Certain exploit or malware may target certain software, particularly software with known vulnerabilities to a malware developer. The vulnerability may denote that the software (or feature of the software) is susceptible to attack; as a result, the feature may become a vulnerability. To that end, an inventory of endpoint configurations (software and hardware) including a database of associated vulnerabilities may be provided at the appliance. The appliance may poll (or receive messages) among endpoints with such different software profiles to provide behavior information of the object. The polled information (or messages received) from the endpoints may be correlated by the appliance against the inventory/database to essentially provide a distributed malware detection system. In response, tasks may be assigned to the endpoints to obtain further information that enables enhanced verification of the infection at the appliance. The endpoints $200_E$ may be selected based on software profiles that are conducive to detection of particular malware, which result in behaviors that may be easier to detect/observe.

Figure 6:
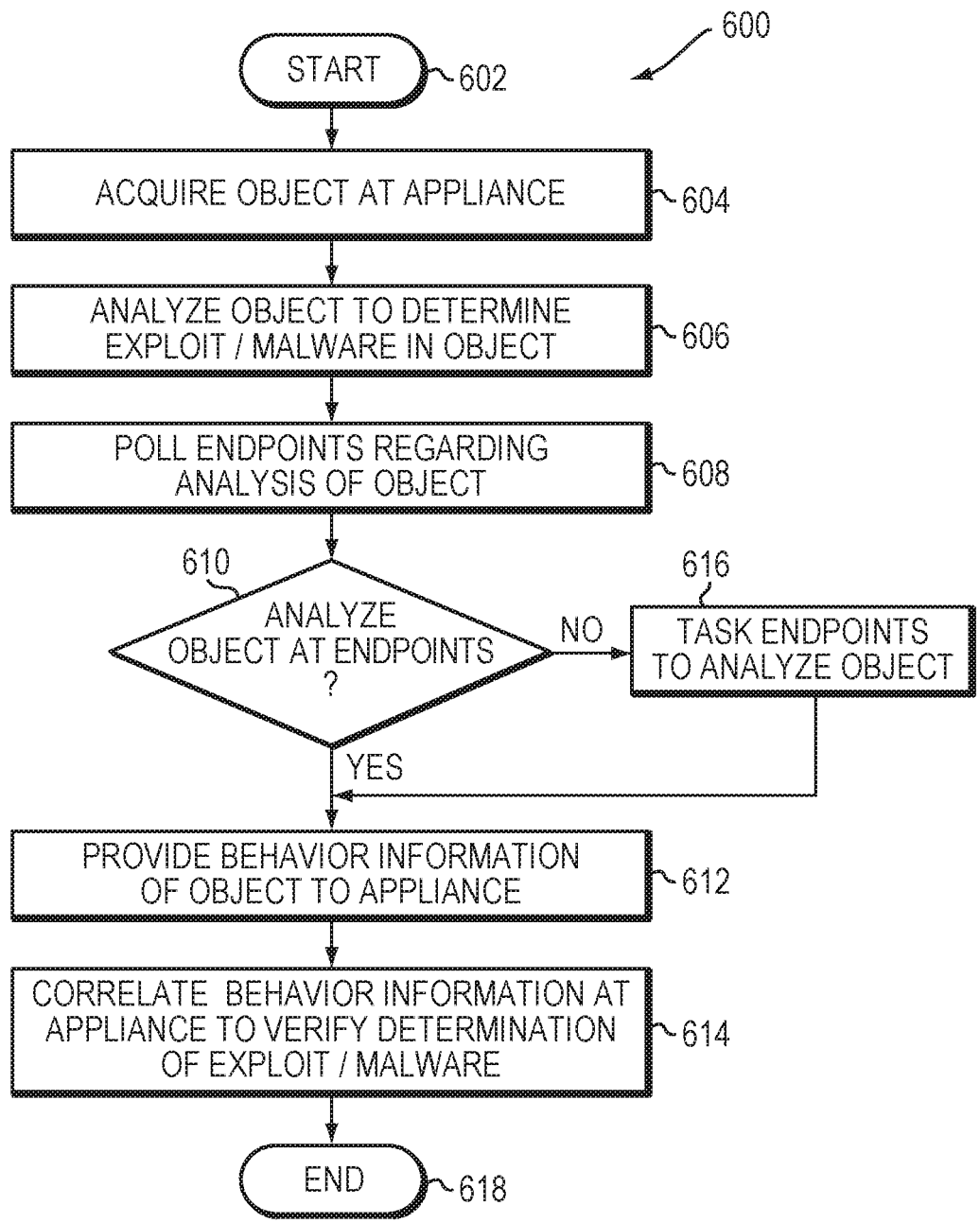
FIG. 6 is an example procedure for verifying an exploit or malware at a malware detection system appliance through correlation with one or more endpoints of the network.

FIG. 6 is an example procedure for verifying an exploit or malware at an MDS appliance through correlation with one or more endpoints of the network. Illustratively, communication traffic in the network may be directed to the endpoints, wherein the traffic may include one or more packets containing an object (e.g., within a payload of the packet). The procedure 600 starts at step 602 and proceeds to step 604 where the MDS appliance may intercept and acquire the object from the communication traffic, i.e., from its position within the network. At step 606, the appliance may perform analysis (e.g., static and/or dynamic analysis) on the object to render an initial determination that the object is suspicious and may contain the exploit or malware. At step 608, the MDS appliance may poll (or receive messages from) the endpoints with regards to analysis of the object, i.e., to inquire as to whether any of the endpoints may have analyzed the object. If the object was analyzed (step 610), the endpoints may provide observed behavior information to the appliance at step 612 and, at step 614, the appliance may correlate that information, e.g., against correlation rules, to verify its subsequent determination of the exploit or malware. If the object was not analyzed at the endpoints (step 610), the appliance may task the endpoints to analyze the object (step 616) to determine whether it contains the exploit or malware and, at step 612, the endpoints may provide the resulting behavior information of the object to the appliance. The procedure then ends at step 618.

While there have been shown and described illustrative embodiments for verifying a determination of an exploit or malware in an object at a MDS appliance through correlation of behavior activity of the object running on endpoints of a network, it is to be understood that various other adaptations and modifications may be made within the spirit and scope of the embodiments herein. For example, embodiments have been shown and described herein with relation to the appliance intercepting communication traffic containing the object for which the appliance rendered a determination of suspiciousness. However, the embodiments in their broader sense are not so limited, and may, in fact, provide a centralized database/repository configured to store and enable access to the object (e.g., one or more packets) present in the network during a specified time period.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

acquiring an object at an appliance coupled to a network;

conducting an analysis of the object at the appliance to render an initial determination that the object is suspicious;

polling each endpoint of a plurality of endpoints coupled to the network to (i) determine whether an endpoint performed a cybersecurity analysis on the object and observed behaviors of the object during the cybersecurity analysis and (ii) provide behavior information of the object to the appliance, the behavior information including the observed behaviors by the endpoint;

correlating the behavior information provided by the plurality of endpoints at the appliance to verify a subsequent determination that the object contains at least one of an exploit and malware; and wherein, responsive to none of the plurality of endpoints performing a cybersecurity analysis on the object, tasking each of the plurality of endpoints to analyze the object to determine whether the object contains the exploit or the malware and return resulting behavior information of the object to the appliance.

2. The method of claim 1, wherein the polling of each endpoint of the plurality of endpoints includes gathering of the behavior information from the plurality of endpoints.

3. The method of claim 1, wherein the correlating of the behavior information comprises applying the behavior information against correlation rules to verify whether the object contains the exploit or the malware.

4. The method of claim 3, wherein the applying of the behavior information against correlation rules provides information associated with a potential spreading of the exploit or malware within the network including the plurality of endpoints.

5. The method of claim 1, wherein the correlating of the behavior information comprises applying the behavior information against correlation rules to identify a pattern of activity associated with the object throughout the network, where the behavior information provides a sampling size sized to obtain a more complete view of the activity pattern.

6. The method of claim 1, wherein the appliance is configured to communicate with and instruct the endpoint of the plurality of endpoints, the endpoint and the appliance are in communication via a security information and event manager (SIEM) appliance.

7. The method of claim 1, wherein prior to polling the plurality of endpoints, the method further comprising:
tasking, by the appliance, at least one endpoint of the plurality of endpoints to analyze the object if the object has not been previously analyzed at the at least one endpoint.

8. A non-transitory storage medium deployed within an appliance that is coupled to a network and includes software that, upon execution, performs a plurality of operations, comprising:
acquiring an object over the network;
conducting an analysis of the object to render a first determination that the object is suspicious;
polling each endpoint of a plurality of endpoints coupled to the network to (i) determine whether an endpoint performed a cybersecurity analysis on the object and observed behaviors of the object during the cybersecurity analysis and (ii) provide behavior information of the object to the appliance, the behavior information including the observed behaviors by the endpoint and the cybersecurity analyses conducted by the plurality of endpoints being independent of the analysis conducted by the appliance; and
correlating the behavior information provided by the plurality of endpoints to verify a second determination, performed subsequent to the first determination, whether the object contains at least one of an exploit and malware.

9. The non-transitory storage medium of claim 8, wherein the polling of the plurality of endpoints conducted by the software includes gathering of the behavior information from the endpoints.

10. The non-transitory storage medium of claim 8, wherein the correlating of the behavior information conducted by the software comprises applying the behavior information against correlation rules to verify whether the object contains the exploit or the malware.

11. The non-transitory storage medium of claim 10, wherein the applying of the behavior information against correlation rules by the software provides information associated with a potential spreading of the exploit or malware within the network including the plurality of endpoints.

12. The non-transitory storage medium of claim 8, wherein the correlating of the behavior information conducted by the software comprises applying the behavior information against correlation rules to identify a pattern of activity associated with the object throughout the network, where the behavior information provides a sampling size sized to obtain a more complete view of the activity pattern.

13. The non-transitory storage medium of claim 8 being deployed within the appliance configured to communicate with and instruct an endpoint of the plurality of endpoints, the endpoint and the appliance are in communication via a security information and event manager (SIEM) appliance.

14. The non-transitory storage medium of claim 8 including software being further configured to perform operations comprising:
tasking at least one endpoint of the plurality of endpoints to analyze the object if the object has not been previously analyzed at the at least one endpoint.

15. An appliance comprising:
a processor; and
a non-transitory storage medium including software that, upon execution by the processor, performs operations including
acquiring an object over a network,
conducting an analysis of the object to render a first determination that the object is suspicious,
polling each endpoint of a plurality of endpoints coupled to the network to receive behavior information of the object, the behavior information is observed from cybersecurity analyses of the object conducted at each endpoint of the plurality of endpoints and the cybersecurity analyses conducted by the plurality of endpoints being independent of the analysis conducted by the appliance, and
correlating the behavior information provided by the endpoints to verify a second determination, performed subsequent to the first determination, whether the object contains at least one of an exploit and malware.

16. The appliance of claim 15, wherein the software, upon execution by the processor, is configured to correlate the behavior information conducted by the software by at least applying the behavior information against correlation rules to verify whether the object contains the exploit or the malware.

17. The appliance of claim 16, wherein the applying of the behavior information against correlation rules by the software provides information associated with a potential spreading of the exploit or malware within the network including the plurality of endpoints.

18. The appliance of claim 15, wherein the software, upon execution by the processor, is configured to correlate the behavior information by at least applying the behavior information against correlation rules to identify a pattern of activity associated with the object throughout the network, where the behavior information provides a sampling size that is sized to obtain a more complete view of the activity pattern.

19. The appliance of claim 15, wherein the software, upon execution by the processor, is configured to communicate with and instruct an endpoint of the plurality of endpoints, the endpoint and the appliance are in communication via a security information and event manager (SIEM) appliance.

20. The appliance of claim 15, where the software, upon execution by the processor, is further configured to perform operations comprising:
  tasking at least one endpoint of the plurality of endpoints to analyze the object if the object has not been previously analyzed at the at least one endpoint.

* * * * *